United States Patent [19]

Baron

[11] E Re. 29,339

[45] Reissued Aug. 2, 1977

[54] PRODUCTION OF N-ALKYLATED AMINES

[75] Inventor: Seymour Baron, Wayne, N.J.

[73] Assignee: Hexcel Corporation, Dublin, Calif.

[21] Appl. No.: 673,150

[22] Filed: Apr. 2, 1976

Related U.S. Patent Documents

Reissue of:

[64] Patent No.: 3,732,311
Issued: May 8, 1973
Appl. No.: 13,793
Filed: Feb. 24, 1970

[51] Int. Cl.[2] ..... 544 178; C07C 85/06; C07C 87/127; C07C 87/14; C07C 87/28

[52] U.S. Cl. ..... 260/585 B; 260/268 R; 260/293.51; 260/570.9; 260/581; 260/583 R; 260/583 P

[58] Field of Search ..... 260/585 B; 252/440

[56] References Cited

U.S. PATENT DOCUMENTS

| | | | |
|---|---|---|---|
| 2,113,241 | 4/1938 | Punnett | 260/585 B |
| 2,871,200 | 1/1959 | Doumani | 252/440 |
| 2,923,696 | 2/1960 | Harwell et al. | 260/585 B X |
| 3,271,447 | 9/1966 | Naylor | 252/440 X |
| 3,383,417 | 5/1968 | Lichtenwalter | 260/584 R |

FOREIGN PATENT DOCUMENTS

| | | | |
|---|---|---|---|
| 410,500 | 5/1934 | United Kingdom | 260/585 B |

*Primary Examiner*—Daniel E. Wyman
*Assistant Examiner*—John J. Doll
*Attorney, Agent, or Firm*—Jacobs & Jacobs

[57] ABSTRACT

This invention enables production of N-alkylated amines without the use of high pressures, and with high recovery, by continuous single-step reaction of an alcohol with either ammonia or a primary or secondary amine, in vapor phase, through the discovery that thorium sulfate, used as a catalyst for the first time in said reaction, enables discard of high pressures, reaction at atmospheric pressure or thereabout, and the use of simple equipment and low labor cost.

9 Claims, No Drawings

PRODUCTION OF N-ALKYLATED AMINES

Matter enclosed in heavy brackets [ ] appears in the original patent but forms no part of this reissue specification; matter printed in italics indicates the additions made by reissue.

In the preparation of N-alkylated amines by removal of water from the reactants consisting of an alcohol and either a primary *or a secondary amine in the presence* of a dehydration catalyst, it long has been sought to secure high yield and at the same time to eliminate the high pressures necessarily required by the industry in its general use of aluminum oxide catalysts and substitutes therefor — as stated, for example, in the patent to Zech (Atlas Chemical Industries, Inc.) 3,347,926 of 1967. But it appears that this has not been accomplished until the present invention. In the said patent the primary object was to reduce high pressures by the use of a metal alloy catalyst; yet the pressures required still were high (1275 to 2300 p.s.i.g.) comparative with the higher pressures (2350 to 3000 p.s.i.) employed with the aluminum oxide catalyst, as stated by I. G. Farbenindustrie A.G. in its French Patent 779,913. Also, thorium oxide has been proposed as a catalyst-substitute for the Al oxide (Organic Synthesis 11, p. 389) but has been found to be inoperative as hereinafter stated in detail.

The present invention eliminates water from the alcohol employed in the reaction, in the presence of either ammonia, a primary or secondary amine, at or about atmospheric pressure, with the use of thorium sulfate as catalyst, and in vapor phase with low temperature.

The alcohols suitable for use include dodecyl, decyl, octadecyl, hexadecyl and tetradecyl alcohols, ethanol, n-propanol; isopropanol, n-butanol, sec.-butanol, isobutanol, amyl alcohol, 1-octanol, 3-octanol. Polyhydric alcohols, such as 1,3-butanediol, diethylene glycol and triethylene glycol also are suitable.

The aminating agents suitable for use in the invention, include ammonia, primary or secondary amines, for example methyl amine, diethyl amine, ethyl amine, butyl amine; isobutyl amine, n-decyl amine, morpholine, piperidine, piperazine, ethylene diamine, diethylene triamine and benzyl amine.

In the reaction, the thorium sulfate catalyst is deposited on a carrier such as pumice, and the amount of said catalyst on the carrier will of course affect the throughput, and while the higher the percentage of the thorium sulfate on the carrier, the greater will be the throughput, if excessive amounts of thorium sulfate are deposited on the carrier the efficiency will be reduced by blocking action on the permeable carrier such as pumice.

In the vapor phase reaction a reactor tube may be used, as described in Organic Synthesis II, p. [289, ] *389,* previously referred to, the tube holding the catalyst on the particles of the pumice carrier. The two reactants may be added to the catalyst-containing tube stoichiometrically, but it is preferred that one of the reactants be in excess, i.e. that one which is most easily removed from the product. For example in the reaction of dimethyl amine with a high molecular alcohol, such as dodecyl alcohol, an excess of dimethyl amine is preferred. The temperature range of the reaction is suitably 200–500° C., with a preferred temperature rate for low by-product formation, of about 360° C.

EXAMPLE 1

Preparation of dodecyl dimethyl amine

The catalyst is prepared by forming a solution of 16.5 *grams of* [(thorium sulfate ($9H_2O$ with 300 ml. $H_{20}$)] *$Th(SO_4)_2 \cdot 9H_2O$ with 300 ml. $H_2O$* and the solution is added to 68 grams of ground pumice, and the mixture placed in a distilling flask, preferably a rotary vacuum distilling flask. The solution is fed into the flask at a rate equal to the distillate, in order that the pumice particles be evenly coated. The coated pumice is dried, as at 105 C. and a content of about 12% Th $(SO_4)_2$ is satisfactory.

50 grams of the said catalyst is charged into a reactor tube, for example as shown and described in O.S. II page 389, and the tube is heated preferably to 360° C. and it is well to condition the tube with a flow of air (as about 500 ml. per minute) for a period of hours. The air flow then is discontinued, and approximately two milli-equivalents of dimethyl amine and 1 milli-equivalent of dodecyl alcohol, per minute, are simultaneously charged into the reactor tube. The outflow is essentially 95% dodecyl amine and 5% dodecene, as determined by G.L.C. If any dodecyl alcohol is present in the product, this indicates that the through-put was too fast, and the residence time of the reacting materials in the tube or column may be set at about 30 seconds.

It has been said in the foregoing that the invention herein is due to the condition that notwithstanding the need through the years for a low temperature and pressure reaction catalyst, and searches therefor, no success has been reached until applicant's discovery that thorium sulfate is commercially effective and supplies the need. This may well be considered remarkable because it is in the face of the proposal in said O.S. II (p. 389) that thorium oxide be used as the catalyst in allied conditions, and the failure thereof, resulting in discard of thorium oxide by the industry since the copyright date of said publication, which is 1936. As an example of such failure:

EXAMPLE 2

Exactly the same materials, steps, temperature and procedures, as specified in Example 1 were proceeded with, except that the catalyst was thorium oxide. There was negative reaction, the output being essentially the starting materials, dodecyl alcohol and [diethyl] *dimethyl* amine.

Having described my invention, what I claim and desire to secure by Letters Patent, is as follows:

1. The production of N-alkylated amines by reaction of an alcohol with a member of the group consisting of [ammonia,] primary amines and secondary amines, by vapor phase reaction with thorium sulfate as a catalyst and at a temperature range of 200–500° C., and without high pressures.

2. The production of N-alkylated amines in accordance with claim 1, under substantially atmospheric pressure.

3. The production of N-alkylated amines in accordance with claim 1 by single step vapor phase reaction with thorium sulfate carried by a granular carrier, with an applied temperature of 300–500° C.

4. The production of N-alkylated amines in accordance with claim 1 with a reaction temperature of about 360° C.

5. In the continuous vapor phase reaction of an alcohol with a member of the group consisting of [ammonia,] primary amines and secondary amines, the use of thorium sulfate as a dehydrating catalyst in said reaction under heat and without high pressures.

6. The production of N-alkylated amines by vapor phase reaction of dodecyl alcohol and dimethyl amine with thorium sulfate as a catalyst, under heat and without high pressures.

*7. The production of N-alkylated amines by reaction of an alcohol selected from the group consisting of ethanol, propanol, butanol, pentanol, octanol, decanol, dodecanol tetradecanol, hexadecanol and octadecanol with a member of the group consisting of primary amines and secondary*

*amines, by vapor phase reaction with thorium sulfate as a catalyst and at a temperature range of 200–500° C., and without high pressures.*

*8. The production of N-alkylated amines by reaction of an alcohol with a secondary amine by vapor phase reaction with thorium sulfate as a catalyst and at a temperature range of 200–500° C., and without high pressures.*

*9. The production of N-alkylated amines by reaction of an alcohol with a primary amine by vapor phase reaction with thorium sulfate as a catalyst and at a temperature range of 200–500° C., and without high pressures.*

* * * * *